United States Patent
Leenknegt et al.

(10) Patent No.: US 6,452,876 B1
(45) Date of Patent: Sep. 17, 2002

(54) POSITIONING SYSTEM AND APPARATUS INCLUDING THE POSITIONING SYSTEM

(75) Inventors: George A. L. Leenknegt; Cornelius A. Hezemans; Antonius H. M. Akkermans, all of Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/555,034

(22) PCT Filed: Sep. 20, 1999

(86) PCT No.: PCT/EP99/07020
§ 371 (c)(1),
(2), (4) Date: May 23, 2000

(87) PCT Pub. No.: WO00/17866
PCT Pub. Date: Mar. 30, 2000

(30) Foreign Application Priority Data

Sep. 23, 1998 (NL) .............................................. 1010156

(51) Int. Cl.$^7$ ................................................ G11B 7/00
(52) U.S. Cl. .................. 369/44.11; 369/53.1; 369/30.25
(58) Field of Search .......................... 369/44.27, 44.28, 369/44.11, 53.1, 30.17, 30.18, 30.25

(56) References Cited

U.S. PATENT DOCUMENTS 5,682,362 A * 10/1997 Suzuki et al. ............ 369/30.15

* cited by examiner

Primary Examiner—Nabil Hindi
(74) Attorney, Agent, or Firm—Michael E. Belk

(57) ABSTRACT

Apparatus for reading and/or writing onto an information carrier includes the positioning system. The positioning system includes a drive member for moving a second part with respect to a first part and a fine-positioning member for moving a third part with respect to the second part. The positioning member also includes control means for continuously controlling the drive member in response to the orientation signal. The control means include control signal generating means for generating a control signal from the orientation signal. The control means further include a sensor for generating an auxiliary signal which is an indication for a current consumed by the drive member, and signal combination means for generating a drive voltage for the drive member in response to the control signal and the auxiliary signal.

14 Claims, 5 Drawing Sheets

POSITIONING SYSTEM AND APPARATUS INCLUDING THE POSITIONING SYSTEM

Figure 1:
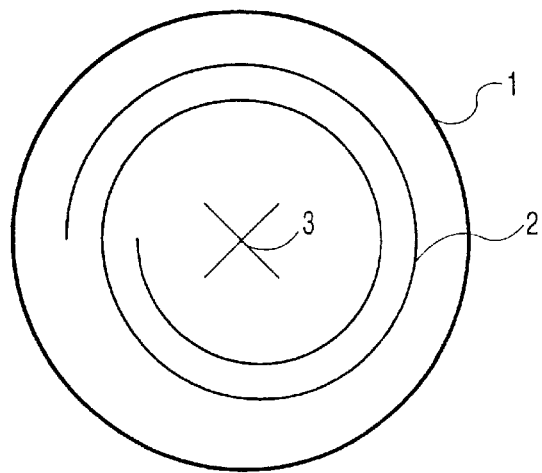

The invention relates to a positioning system as defined in the opening part of claim 1.

The invention further relates to an apparatus as defined in the opening part of claim 5.

An apparatus including such a positioning system is known from GB-B-1 429 882. The known apparatus is suitable for reading optical information carriers. For this purpose, the transducer has a radiation-sensitive detector which generates a read signal in response to the radiation reflected from or transmitted by the information carrier. The supporting means take the form of a slide which is driven by a motor via a transmission formed by a worm-and-rack combination. For such uses the motor is generally constructed as a brush motor. The cooperation of the drive member and the fine-positioning member in the positioning system should combine an accurate positioning of a read or write location on the data carrier with a short access time. For a short access time it is desirable that the transmission ration, which is defined as the ratio obtained by dividing the slide travel by the angular rotation of the motor. A drawback is then that friction in the slide drive and cogging will play an important part. Cogging is the effect that the motor tends to assume preferential positions. These effects may give rise to such large deviations between the position occupied by the transducer and a desired position that these can no longer be corrected by the fine-positioning member. It is then no longer possible to read or write information from/to the information carrier in a reliable manner.

It is an object of the invention to take a measure which allows a comparatively large transmission ratio in an apparatus of the type defined in the opening paragraph, without this leading to impermissibly large deviations in the position assumed by the transducer. To achieve this object the apparatus in accordance with the invention has the characteristic features defined in claim 5. To achieve this object the positioning system in accordance with the invention has the characteristic features defined in claim 1.

Since the drive voltage in the positioning system in accordance with the invention and in the apparatus in accordance with the invention also depends on the current consumed by the drive member a better reproducible response of the drive member to the control signal is obtained. As a result of this, the second part (the supporting means, for example the slide) follows the third part (the transducer or a part thereof) with greater precision, so that the corrections to be performed by the fine-positioning member can be smaller.

The orientation signal, which represents the position of the third part with respect to the second part, can be generated by means of a sensor, for example by means of a capacitive or an inductive sensor. However, the embodiment defined in Claim 2 is to be preferred. This embodiment does not require any additional components for the generation of the orientation signal.

An attractive embodiment of the apparatus in accordance with the invention is defined in Claim 3. It is also possible to select a greater value for the constant, than the value for the upper limit mentioned in this Claim. However, this entails the risk that the positioning system becomes unstable in the case of small excursions of the components of the signal combination means or of the drive member.

For controlling the drive member it may be desirable to utilize a driver across whose output terminals a voltage is available which is substantially symmetrical with respect to ground. In that case the current consumed by the drive member can be measured more accurately in the embodiment defined in Claim 4.

The reliability of the information recorded on the record carrier and the information reconstructed therefrom can be improved by means of the measures defined in claim 6.

Figure 3:
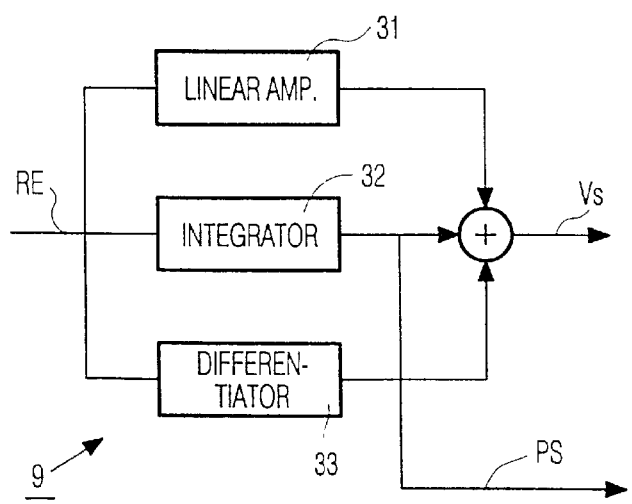
Figure 4:
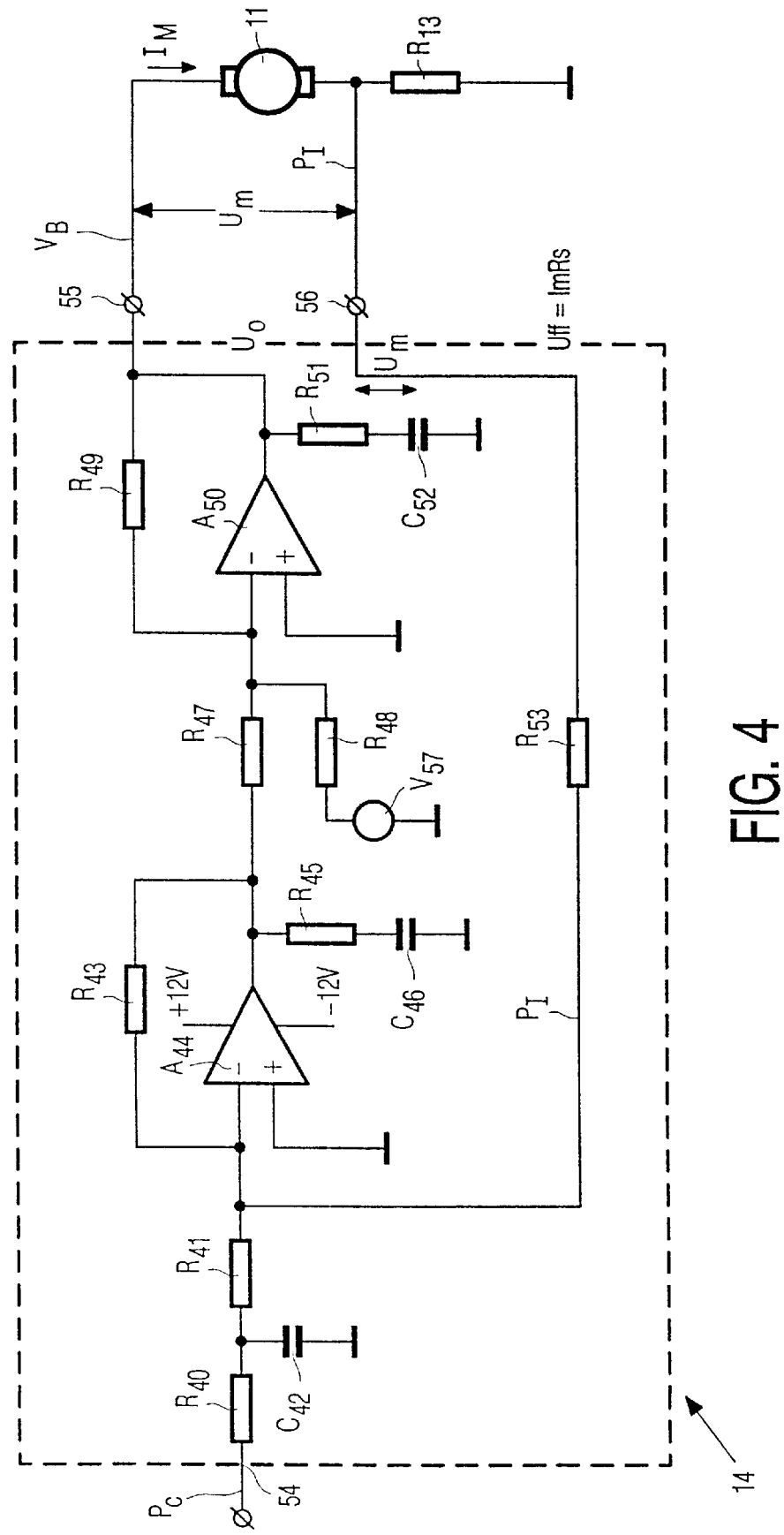
Figure 5A:
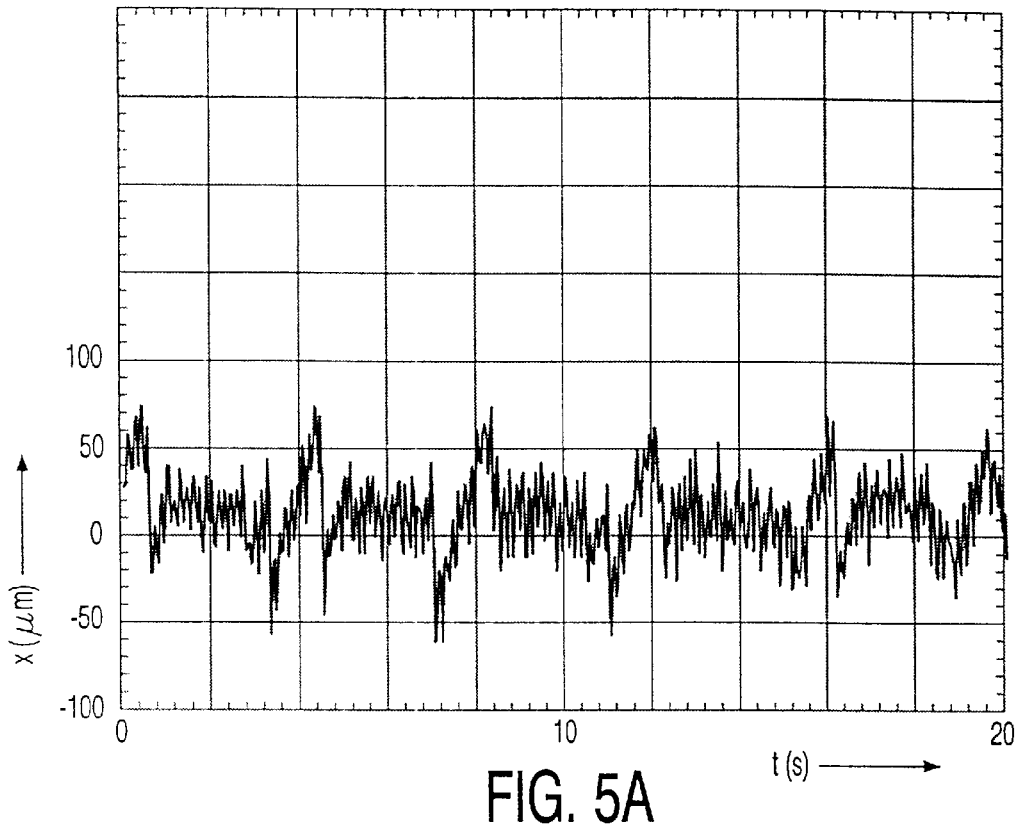
Figure 5B:
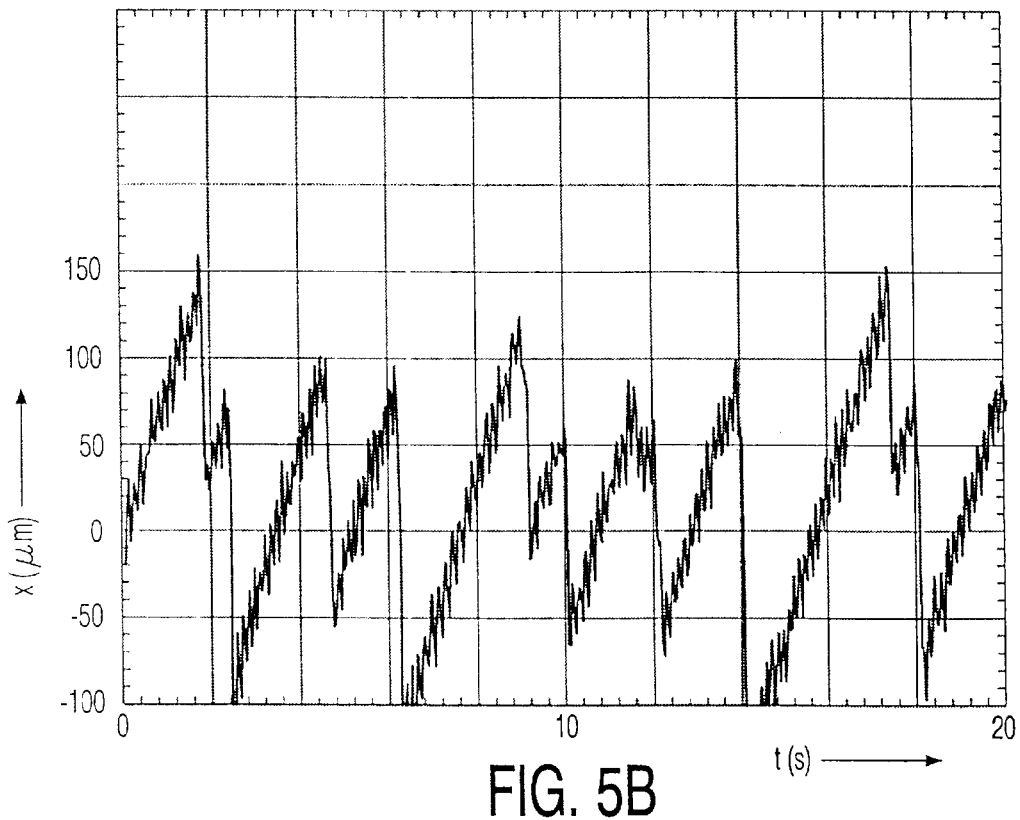
Figure 6:
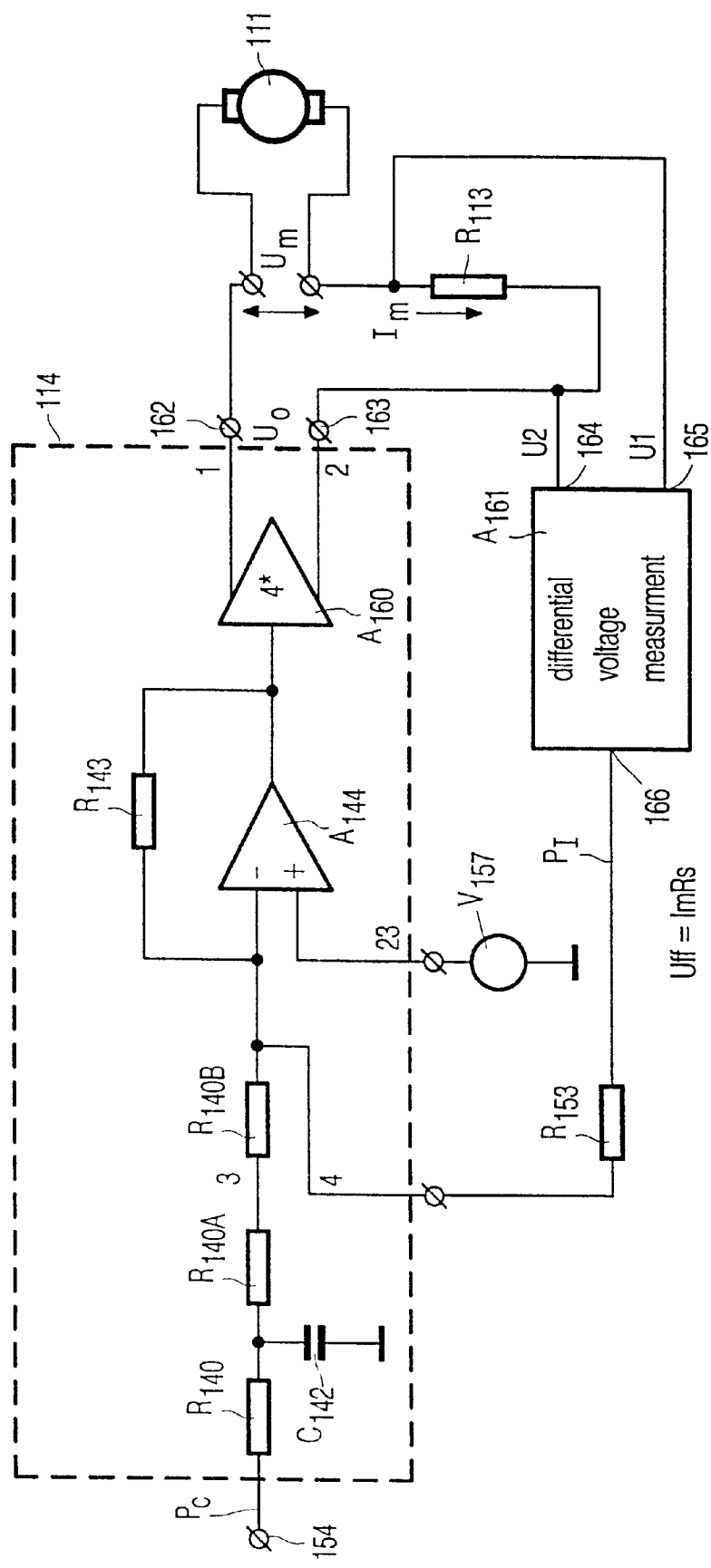
Figure 7:
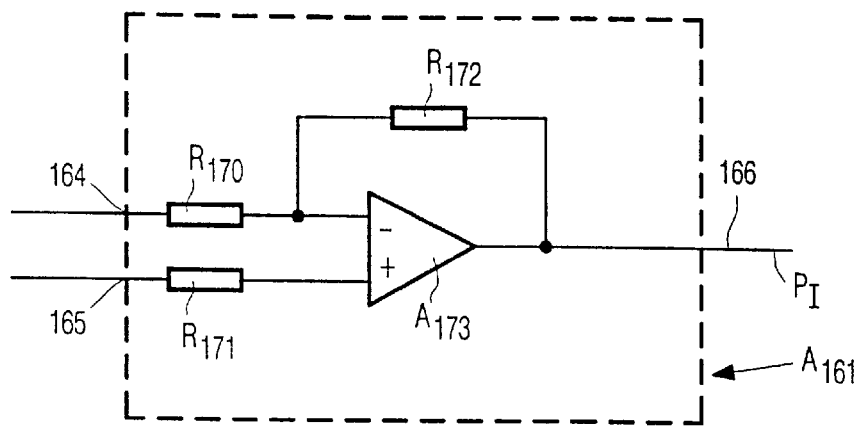
Figure 8:
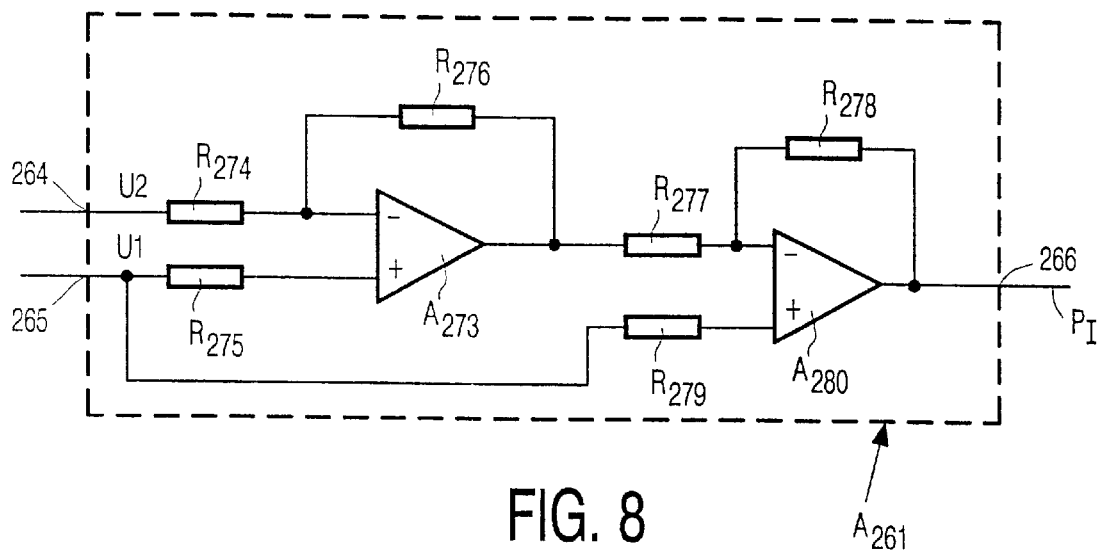
Figure 9:
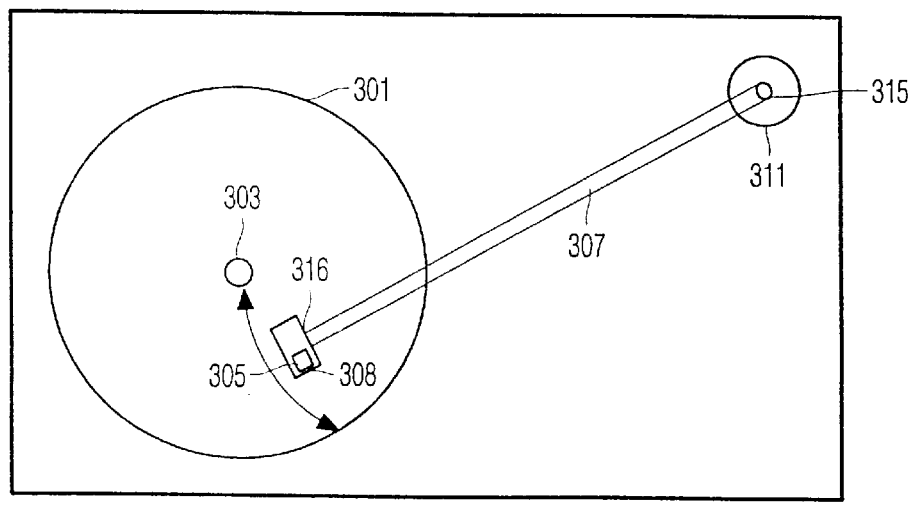

These and other aspects of the invention will be described in more detail with reference to the drawings. In the drawings FIG. 1 shows an information carrier, FIG. 2 shows diagrammatically an embodiment of an apparatus in accordance with the invention including a positioning system in accordance with the invention, FIG. 3 shows in more detail a circuit which forms part of the present apparatus in accordance with the invention, FIG. 4 shows in more detail a further circuit which forms part of the present apparatus in accordance with the invention, FIGS. 5A and 5B show results of measurements carried out on the present apparatus in accordance with the invention and on a prior-art apparatus, respectively, FIG. 6 shows a circuit which forms part of a second embodiment of the positioning system in accordance with the invention, FIGS. 7 and 8 show implementations of a part of the circuit of FIG. 6, and FIG. 9 shows a further embodiment of the apparatus in accordance with the invention.

FIG. 1 shows an example of an information carrier 1. The information carrier 1 is of a conventional type, in the present case an optical information carrier. In the present example information is recorded in tracks in the form of consecutive turns of a spiral 2.

Figure 2:
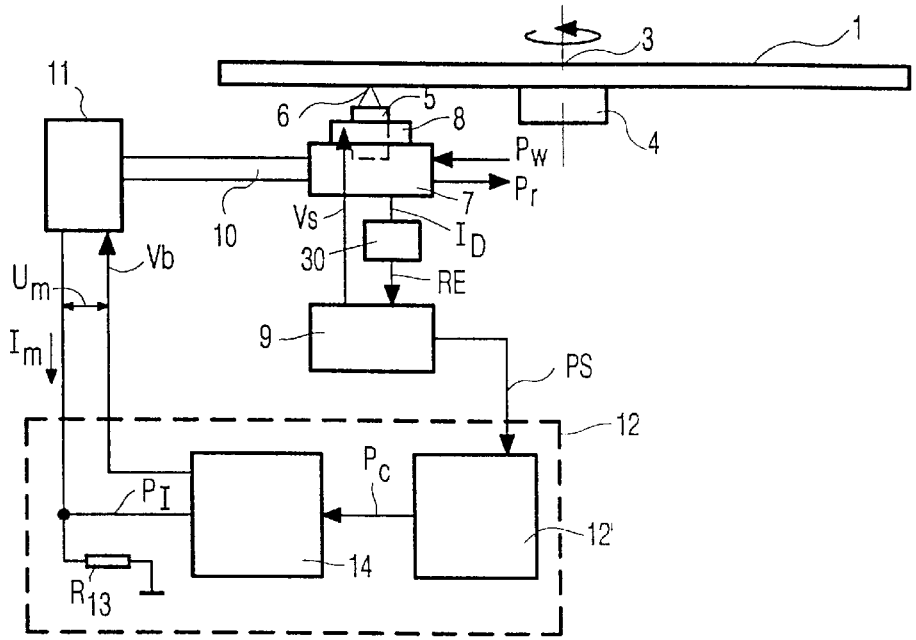

FIG. 2 shows diagrammatically an apparatus for reading and/or writing data from/onto such an information carrier. The apparatus shown has a motor 4 for rotating the information carrier about an axis of rotation 3. The apparatus includes a positioning system having a drive member 11 for moving a second part 7 with respect to a first part 1. In the present case the information carrier forms the first part 1. The second part is formed by supporting means 7 for a transducer 5. In the present embodiment the drive member is a rotary motor 11. A transmission 10 converts the rotation of the motor into a linear movement of the supporting means with a transmission ratio K. However, the invention applies likewise to a positioning system which employs another type of motor, for example a linear motor.

The supporting means 7 are constructed as a slide which is radially movable with respect to the information carrier 1 over a distance of a few cm. In the present case, the transducer is an optical transducer for generating as read signal $P_R$ in response to an optical pattern recorded on the information carrier 1 and/or for recording an optical pattern on the information carrier 1 in response to a write signal $P_W$. In another embodiment the transducer takes the form of a magnetic head by means of which magnetic patterns can be read and/or written.

The positioning system further includes a fine-positioning member 8 for moving a third part, formed by the transducer 5, with respect to the second part, formed by the supporting means 7. The fine-positioning member enables the transducer to make a radial movement with respect to the supporting means within a range of a few hundreds of $\mu$m. The fine-positioning member 8 comprises, for example, magnetic or piezoelectric means for moving the transducer 5. It is not necessary for the fine-positioning member to move the transducer as a whole. In an optical transducer the fine-positioning member may, for example, take the form of a rotatable mirror via which a radiation beam is imaged onto the information carrier. In that case the other parts of the transducer are moved exclusively by the supporting means.

The positioning system includes error signal generating means 30 for generating an error signal RE which is an indication of a difference between an instantaneous orientation and a desired orientation of the third part (the transducer 5) with respect to the first part (the information carrier 1). The expert is acquainted with various methods of generating the error signal RE. The present embodiment of the apparatus in accordance with the invention utilizes an optical transducer comprising four detectors. The four detectors each supply a detection signal. The detection signals together form the composite signal Identification. The error signal RE (radial push-pull signal) is generated from this composite signal by means of the method described in EP 508 522 A2. There are also methods of generating the error signal by means of a smaller number, for example 2, detectors or, conversely, a larger number of detectors.

The positioning system further includes a tracking circuit 9. The tracking circuit, shown in more detail in FIG. 3, controls the fine-positioning member 8 in response to the error signal RE. For this purpose, the error signal RE is applied to a proportional amplifier 31, an integrating amplifier 32 and a differentiating amplifier 33. The summing device 34 supplies a control $V_S$ to the fine-positioning member, which signal is a measure of the sum of the output signals of the three amplifiers 31, 32, 33. The output signal of the integrating amplifier 32 also serves as the orientation signal PS, as a result of which no separate parts are required for measuring the position of the fine-positioning member. The orientation signal PS is a measure of the instantaneous orientation of the third pant, the transducer 5, with respect to the second part, the supporting means 7. Thus, the integrating amplifier 32 also forms orientation signal generating means.

The positioning system has control means 12 for continuously controlling the drive member 11 in response to the orientation signal PS. The control means 12 are adapted to control the drive member 11 in such a manner that the fine-positioning member 8 remains in the center of its range of movement, insofar as this is possible. The control means 12 include control signal generating means 12' for generating a control signal PC from the orientation signal PS.

The control means 12 further include a sensor $R_{13}$ for generating an auxiliary signal $P_1$ which is an indication of a current Insertion means consumed by the drive member 11. The signal combination means 14 have a first input 54 for receiving the control signal Pc, a second input for receiving the auxiliary signal $P_1$ and an output for supplying a drive voltage Um to the drive member 11. The first input 54 is coupled to an inverting input of a first operational amplifier $A_{44}$ via a resistive impedance $R_{40}$ and a resistive impedance $R_{41}$. A node common to the resistive impedances $R_{40}$ and $R_{41}$ is coupled to ground via a capacitive impedance $C_{42}$. A non-inverting input of the first operational amplifier $R_{44}$ is also connected to ground. The first operational amplifier $R_{44}$ has an output connected to its inverting input via a resistive impedance $R_{43}$. Said output is also connected to ground via a resistive impedance $R_{45}$ and a capacitive impedance $C_{46}$. Furthermore, said output is connected to an inverting input of a second operational amplifier $A_{50}$ via a resistive impedance $R_{47}$. The last-mentioned inverting input is also connected to a reference voltage source $V_{57}$ via a resistive impedance $R_{48}$. The reference voltage source $V_{57}$ makes it possible to compensate for an offset which may appear on the input 54. The second operational amplifier $A_{50}$ has a non-inverting input connected to ground. An output of the second operational amplifier $A_{50}$ also constitutes the output 55 of the signal combination means 14. The output is coupled to the inverting input of the second operational amplifier $A_{50}$ via a resistive impedance $R_{49}$. Said output is also coupled to ground via a series arrangement of a resistive impedance $R_{51}$, and a capacitive impedance $C_{52}$. The input 56 for receiving the auxiliary signal $P_1$ is connected to the inverting input of the first operational amplifier $A_{44}$ via a resistive impedance $R_{53}$.

The apparatus shown in FIGS. 2 through 4 operates as follows. During reading the transducer 5 follows a pattern recorded on the information carrier 1, for example an optical or a magnetic pattern, owing to the relative movement between the transducer 5 and the information carrier 1 and generates a read signal $P_R$ in response thereto. During writing a pattern is recorded on the record carrier in response to a write signal $P_W$. In both cases the transducer moreover generates the composite signal $I_D$ In response to this signal the means 30 generate the error signal RE. The tracking circuit 9 derives the orientation signal PS from the error signal RE in a customary manner, which orientation signal is a measure of the instantaneous orientation of the third part, the transducer 5, with respect to the second part, the supporting means. The control means 12' generate the control signal Pc in a customary manner.

The behavior of the motor 11 may be described roughly by the following differential equation:

$$U_m = J/k.R_m.d\omega/dt + T_Q/k.R_m, \quad (1)$$

where: $U_m$ is the voltage across the drive member 11, $\omega$ is the angle of rotation of the motor, k is a constant, $R_m$ is the internal resistance of the drive member, $T_Q$ is the friction experienced by the motor.

Solving the differential equation yields:

$$\omega(t) = \omega(0).e^{-t/\tau}, \quad (2)$$

where the time constant $\tau$ is equal to:

$$\tau = J.R_m/k^2 \quad (3)$$

The signal combination means 14 control the motor 11 by means of a voltage Um which complies with:

$$Um = \alpha.P_C + \beta.Im, \quad (4)$$

where $\alpha$ and $\beta$ are constants.
In the present example the following holds:
$R_{43}$ 150 kΩ, $R_{53}$=47 kΩ, $R_{49}$=300 kΩ, $R_{47}$=150 kΩ and $R_{13}$=1.8 Ω. The internal resistance Rm of the motor is 14 Ω.
The constants $\alpha$ and $\beta$ comply with $$\alpha = R_{43}/(R_{40}+R_{41}).R_{49}/R_{47} = 3.19, \quad (5)$$

$$\beta = (R_{43}/R_{53}.R_{49}/R_{47}-1)R_{13} = 9.69 \text{ Ω} = 0.69 \text{ Rm} \quad (6)$$

Consequently, the value for $\beta$ meets the afore-mentioned requirement that 0<$\beta$<0.9 Rm. The combination of the motor 11 and the signal combination means 14 exhibits the same response as a motor having a time constant $\tau'$, where $$\tau' = \tau.[1-\beta/Rm]. \quad (7)$$

Substitution of the above data in formula 7 reveals that the time constant $\tau'$ is a factor of 3.3 as small as the time constant $\tau$. The smaller time constant results in a faster response of the motor to the control signal $P_C$. In this way it is also achieved that the influence of preferential positions of the motor is also reduced, as a result of which the "cogging" effect is also counteracted.

During reading of an information carrier the excursion of the fine-positioning member was measured while reading an information carrier centered about the axis of rotation 3 with an accuracy of approximately 1 µm. The excursion as a function of time is shown in FIG. 5A. Moreover, the excursion was measured in a prior-art apparatus not including the signal combination means as described hereinbefore and having a motor powered directly by the control means. The results of this measurement is shown in FIG. 5B. In both cases the transmission ratio was K=0.39 mm/rad. A comparison of FIGS. 5A and 5B shows that in the apparatus in accordance with the invention the fine-positioning member requires substantially smaller excursions because the supporting means keep better in track with the transducer. In the apparatus in accordance with the invention the excursions x of the fine-positioning member with respect to the center of its range are limited to approximately 70 µm. In the prior-art apparatus excursions x larger than 150 µm occur. In practice, allowance is to be made for the fact that the information carrier may have an intrinsic eccentricity of 150 µm and that as a result of deviations in the position of the information carrier on the apparatus a further eccentricity of maximum 70 µm can be introduced. In the prior-art apparatus excursions x of 370 µm would occur in that case. However, in practice optical transducers have only a range of approximately 300 µm. Outside this range the read signal generated by the transducer becomes unreliable. In the apparatus not in accordance with the invention the excursion remains smaller than 300 µm, even if allowance is made for the maximum intrinsic eccentricity of the information carrier and the maximum value of the further eccentricity.

FIG. 6 shows signal combination means 114, the sensor 113 and the drive member 111 in a second embodiment of the positioning system in accordance with the invention. Parts therein which correspond to those in FIG. 4 bear the same reference numerals incremented by 100. Instead of an amplifier ($A_{50}$) which supplies a single-ended drive voltage with respect to ground the signal combination means in the present embodiment include an amplifier $A_{160}$ which supplies the drive voltage between a first output 162 and a second output 163. The sensor R $_{113}$ takes the form of a resistive impedance in series with the drive member 111. The auxiliary signal $P_1$ is generated by a differential amplifier 161 having a first and a second input 164, 165 interconnected by the resistive impedance $R_{113}$.

A first practical implementation of the differential amplifier 161 is shown in FIG. 7. Parts therein which correspond to those in FIG. 6 bear the same reference numerals.

FIG. 8 shows a second implementation of the differential amplifier 2262. Parts therein which correspond to those in FIG. 6 bear the same reference numerals incremented by 100.

FIG. 9 shows a further embodiment of the apparatus in accordance with the invention. Parts therein which correspond to those in FIG. 2 have the same reference numerals incremented by 300. In the present apparatus the fine-positioning member 308 is secured to one end 316 of an arm 307 which is rotatable about an axis 315 by means of the drive member 311. The arm 307 then forms the second part. When the arm 307 is rotated the end 316 is moved substantially radially with respect to the axis of rotation 303 of the information carrier.

It is obvious that the invention is not limited to apparatuses for reading and/or writing onto a disc-shaped information carrier. The positioning system can also be used, for example, in an apparatus for reading and/or writing onto a tape-like information carrier, the information carrier, a chassis of the apparatus and a transducer respectively forming a first, a second and a third part.

The invention further relates to any novel characteristic feature and any novel combination of characteristic features.

What is claimed is:

1. A positioning system including:
    a drive member for moving a second part with respect to a first part;
    a fine-positioning member for moving a third part with respect to the second part;
    error signal generating means for generating an error signal which is an indication of a difference between an instantaneous orientation and a desired orientation of the third part with respect to the first part;
    a tracking circuit for controlling the fine-positioning member in response to the error signal;
    orientation signal generating means for generating an orientation signal which is a measure of the instantaneous orientation of the third part with respect to the second part;
    control means for continuously controlling the drive member in response to the orientation signal and including:
        control signal generating means for generating a control signal from the orientation signal;
    a sensor for generating an auxiliary signal which is an indication for a current consumed by the drive member; and
    signal combination means for generating a drive voltage for the drive member in response to the control signal and the auxiliary signal.

2. The system of claim 1, in which the tracking circuit includes an integrator for controlling the fine-positioning member, the integrator also supplying the orientation signal.

3. The system of claim 1, in which the drive voltage complies with:
    $Um = \alpha * P_c + \beta * I_m$, where $U_m$ is the drive voltage, $\alpha$ and $\beta$ are constants, $P_c$ is the control signal, $I_m$ is the current consumed by the drive member, $0 < \beta < 0.9 * Rm$, and Rm is the internal resistance of the drive member.

4. The system of claim 1, in which the sensor includes a resistive impedance in series with the drive member, and the sensor includes a differential amplifier having a first and a second input interconnected by the resistive impedance for generating the auxiliary signal.

5. The system of claim 1, in which:
    the tracking circuit includes an integrator for controlling the fine-positioning member, the integrator also supplying the orientation signal;
    the drive voltage complies with: $Um = \alpha * P_c + \beta * I_m$, where $U_m$ is the drive voltage, $\alpha$ and $\beta$ are constants, $P_c$ is the control signal, $I_m$ is the current consumed by the drive member, $0 < \beta < 0.9 * Rm$, and Rm is the internal resistance of the drive member; and
    the sensor includes a resistive impedance in series with the drive member, and the sensor includes a differential amplifier having a first and a second input interconnected by the resistive impedance for generating the auxiliary signal.

6. Apparatus for reading and/or writing data from/onto an information carrier, comprising:
    a transducer for generating a read signal in response to a pattern recorded on the information carrier and/or for recording a pattern on the information carrier in response to a write signal;

transducer supporting means for supporting the transducer;

a drive member for moving the transducer supporting means with respect to the information carrier;

a fine-positioning member for moving at least a part of the transducer with respect to the transducer supporting means;

error signal generating means for generating an error signal which is an indication of a difference between an instantaneous orientation and a desired orientation of the transducer part with respect to the information carrier;

a tracking circuit for controlling the fine-positioning member in response to the error signal;

orientation signal generating means for generating an orientation signal which is a measure of the instantaneous orientation of the transducer part with respect to the transducer supporting means;

control means for continuously controlling the drive member in response to the orientation signal and including:

control signal generating means for generating a control signal from the orientation signal;

a sensor for generating an auxiliary signal which is an indication for a current consumed by the drive member; and signal combination means for generating a drive voltage for the drive member in response to the control signal and the auxiliary signal.

7. The apparatus of claim 6, further comprising:

channel encoding means for channel encoding the write signal.

8. The apparatus of claim 6, further comprising:

channel decoding means for channel decoding the read signal.

9. The apparatus of claim 6, further comprising:

encoding means for encoding the write signal for subsequent error correction.

10. The apparatus of claim 6, further comprising:

decoding means for decoding the read signal for error correction.

11. The system of claim 6, in which the tracking circuit includes an integrator for controlling the fine-positioning member, the integrator also supplying the orientation signal.

12. The system of claim 6, in which the drive voltage complies with:

$Um=\alpha*P_c+\beta*I_m$, where $U_m$ is the drive voltage, $\alpha$ and $\beta$ are constants, $P_c$ is the control signal, $I_m$ is the current consumed by the drive member, $0<\beta<0.9*Rm$, and Rm is the internal resistance of the drive member.

13. The system of claim 6, in which the sensor includes a resistive impedance in series with the drive member, and the sensor includes a differential amplifier having a first and a second input interconnected by the resistive impedance for generating the auxiliary signal.

14. The system of claim 1, in which:

the apparatus further comprises channel encoding means for channel encoding the write signal;

the apparatus further comprises channel decoding means for channel decoding the read signal;

the apparatus further comprises encoding means for encoding the write signal for subsequent error correction;

the apparatus further comprises decoding means for decoding the read signal for error correction;

the tracking circuit includes an integrator for controlling the fine-positioning member, the integrator also supplying the orientation signal;

the drive voltage complies with: $Um=\alpha*P_c+\beta*I_m$, where $U_m$ is the drive voltage, $\alpha$ and $\beta$ are constants, $P_c$ is the control signal, $I_m$ is the current consumed by the drive member, $0<\beta<0.9*Rm$, and Rm is the internal resistance of the drive member; and the sensor includes a resistive impedance in series with the drive member, and the sensor includes a differential amplifier having a first and a second input interconnected by the resistive impedance for generating the auxiliary signal.

* * * * *